Feb. 4, 1930. E. I. DODDS 1,745,662
SNUBBER
Filed Jan. 25, 1926
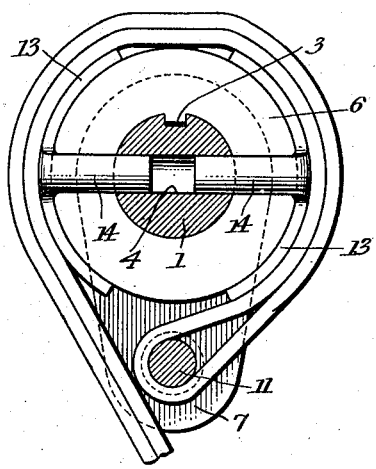
Fig. 2.
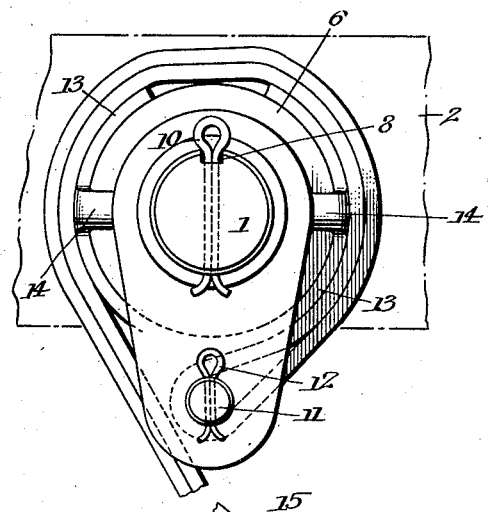
Fig. 3.
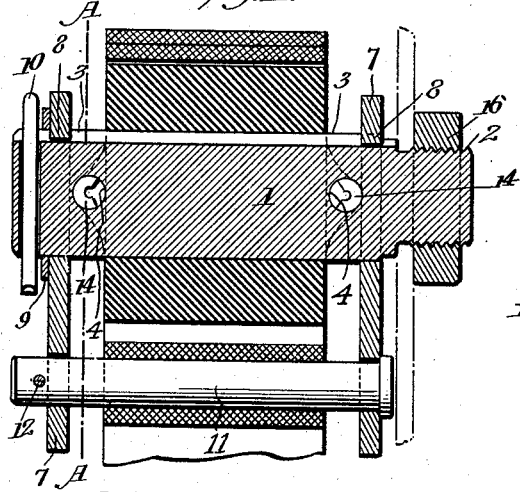
Fig. 1.
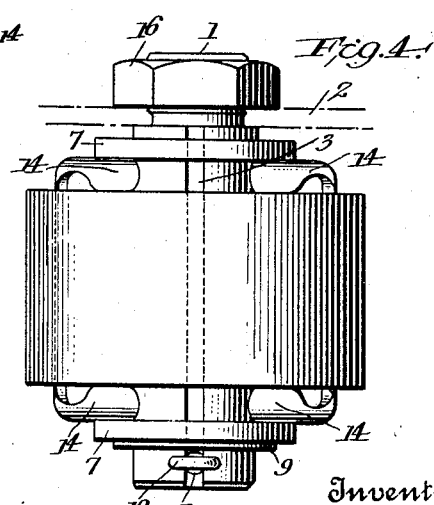
Fig. 4.
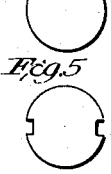
Fig. 5.
Fig. 7.
Fig. 6.
Fig. 9.
Fig. 8.
Fig. 10.
Inventor
Ethan I. Dodds
By Attorney Patented Feb. 4, 1930

1,745,662

UNITED STATES PATENT OFFICE

ETHAN I. DODDS, OF CENTRAL VALLEY, NEW YORK

SNUBBER

Application filed January 25, 1926. Serial No. 83,740.

This invention relates to an improved form of snubber or rebound check for the springs of vehicles, and the present invention is a modification of the device shown in my copending application entitled "Snubbers," Serial No. 83,739, filed of even date herewith.

It is an object of this invention to provide an effective snubber of the utmost simplicity consistent with proper operation under the most severe conditions, thus producing a snubber that may be easily understood, installed and serviced.

It is another object of this invention to provide an endless strap type snubber or rebound check connected between the vehicle frame and springs wherein a rubber block is placed under compression between members over which the strap is wound so that the strap will resist a pull due both to the compression resistance of the rubber block and to the increased sliding friction set up between the strap and said members due to the pressure set up by the compression of the rubber.

Other and further important objects of this invention will be apparent from the disclosures in the specification and the accompanying drawings.

This invention (in a preferred form) is illustrated in the drawings and hereinafter more fully described.

On the drawings:

Figure 1 is a vertical section of a snubber embodying the preferred form of this invention the section being taken on the line I—I of Figure 3.

Figure 2 is a cross section taken on the line II—II of Figure 1.

Figure 3 is a front view or elevation of the snubber with the dust cover removed.

Figure 4 is a top plan view of Figure 3.

Figure 5 is a plan of a modification of the rubber element shown in spherical form.

Figure 6 is a view of another modification involving a cubical form of the rubber element.

Figure 7 shows a cylindrical rubber element with fastening grooves.

Figure 8 shows a rectangular rubber element.

Figure 9 is a view showing how a cylindrical rubber element can be built up as a spiral.

Figure 10 discloses how the rubber element may be built up of laminations.

As shown on the drawings:

A base member 1 forming a mounting stud is shouldered and threaded at 2 to receive a nut 16, the nut clamping the vehicle frame 20 against the shoulder to secure the stud thereto. The stud has a keyway 3 cut therein to locate a pair of crank or strap supports 7 which have a corresponding tongue 8 entering the keyway to prevent rotation of the strap supports about the stud. A rubber resilient member 6 is slipped onto the stud between the two strap supports and the periphery thereof is partly enveloped by two arcuate members 13 provided with inwardly extending arms 14 which are a free fit in holes 4 in the stud on either side of the rubber member.

The strap supports 7 are connected by a bar or bolt 11. A double or endless strap 17 has one loop passing around this bolt 11, the strap then passing up and around the two arcuate members 13 and down to the axle or spring connection 15.

A washer 9 is slipped over the outer end of the stud outside the strap support, and if desired a dust cover 18 may be added and held in place by a cotter pin 10 as shown in Figure 1.

The snubber is assembled with the strap under initial tension so that when the axle system of a vehicle is deflected the slack in the strap is taken up by expansion of the resilient rubber member. On the spring rebound the resulting outward pull on the strap is resisted both by the friction of the strap on the arcuate members and by the resistance of the rubber to compression or deformation, the rubber being squeezed or bulged out at the sides due to the arcuate members being forced together by the choking pull of the strap. The resistance of the snubber therefore builds up rapidly as the strap is drawn out so that the initial resistance at the normal spring position is comparatively slight and leaves the spring system free to absorb slight jolts.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a snubber a stud adapted to be secured to the frame of a vehicle, a cylindrical rubber cushion mounted on said stud, stiffening members partially enveloping the periphery of said cushion, strap supports non-rotatively mounted on said stud on either side of said cushion and a strap passing around said stiffening members, one end of said strap being secured to said strap supports and the other end extending to some part of the axle system movable relatively to said frame.

2. In a snubber a stud adapted to be secured to the frame of a vehicle, a cylindrical rubber cushion mounted on said stud, stiffening members partially enveloping the periphery of said cushion, strap supports non-rotatively mounted on said stud on either side of said cushion and a strap passing around said stiffening members, one end of said strap being secured to said strap supports and the other end extending to some part of the axle system movable relatively to said frame, and a cover adapted to be secured to said central supporting member.

In testimony whereof I affix my signature.

ETHAN I. DODDS.